July 2, 1963  E. G. SPANGLER ETAL  3,096,204
METHOD OF MAKING A COATED FIBROUS FILTER ELEMENT
Filed Dec. 29, 1958
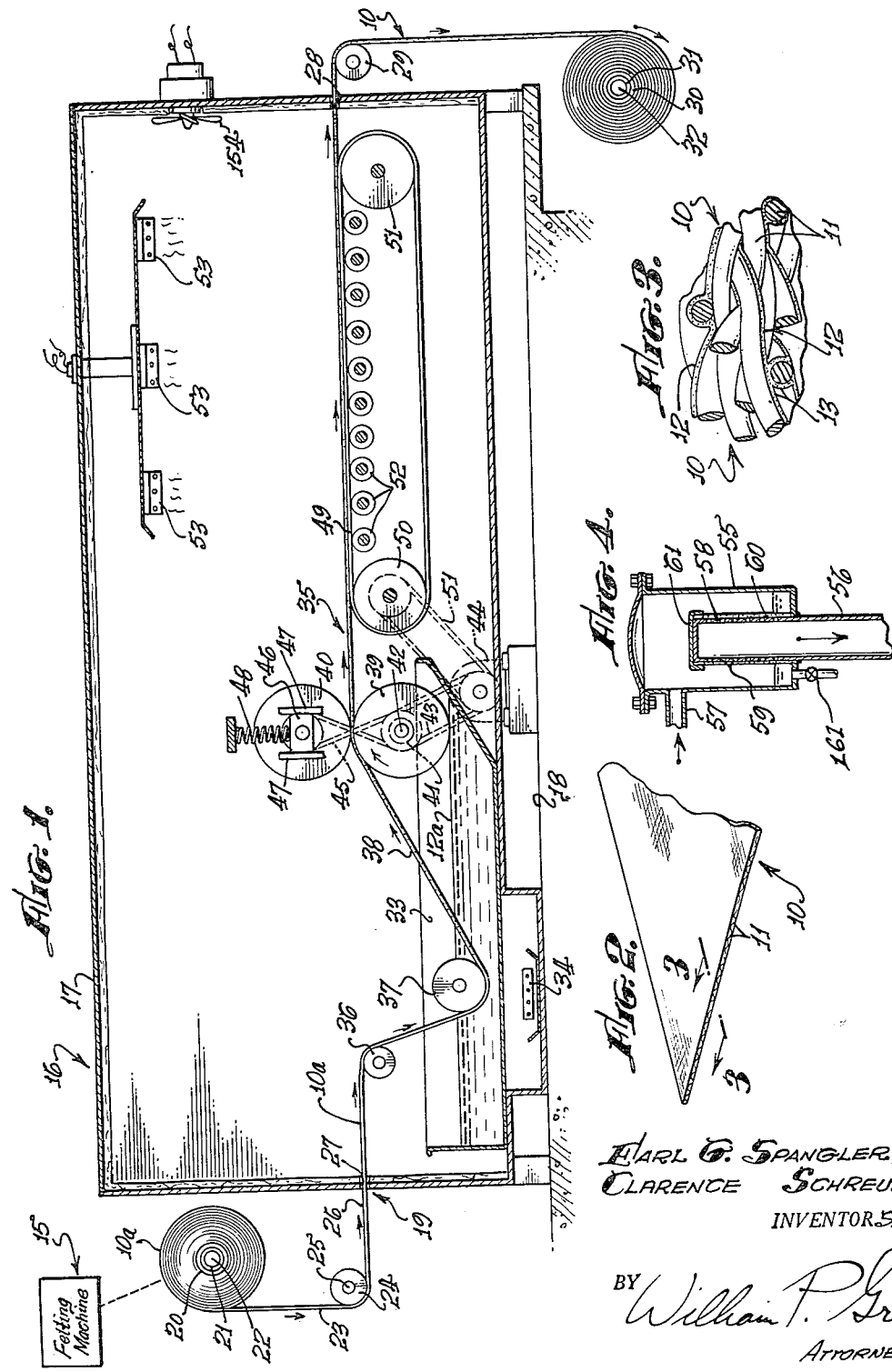
EARL G. SPANGLER,
CLARENCE SCHREUR,
INVENTORS.
BY William P. Green
ATTORNEY.

United States Patent Office 3,096,204
Patented July 2, 1963

3,096,204
METHOD OF MAKING A COATED FIBROUS
FILTER ELEMENT
Earl Girrard Spangler, Newport Beach, and Clarence
Schreur, Escondido, Calif.; said Schreur assignor to
said Spangler
Filed Dec. 29, 1958, Ser. No. 773,610
10 Claims. (Cl. 117—98)

This invention relates to an improved type of filter element, and to a preferred method for forming the element.

In the filtering of liquid hydrocarbon fuels, such as aviation gasoline, jet fuel, rocket fuel, etc., one of the biggest difficulties encountered is that of effectively separating out entrained water from the fuel. In order to adequately protect the engines or components which are to use this fuel, it is highly desirable that substantially all such water be removed; and yet conventional types of filters will not perform this function effectively. A major object of the present invention is therefore to provide a filter element which will effectively separate water from a hydrocarbon liquid, and preferably which will also serve to filter out other types of impurities from the fuel.

To achieve this purpose, a filter element formed in accordance with the invention takes the form of a porous sheet of material having a large number of minute passages formed therein which are capable of selectively passing a hydrocarbon liquid through the sheet, but will not pass water therethrough. More specifically, the sheet includes fibers which are arranged in a closely proximate relation in the sheet, such that the discussed minute fluid passages are provided between the adjacent fibers. Desirably, the fibers are matted together in a random nonwoven fashion, typically by a conventional felting machine.

The filter is given its capacity for selectively passing a hydrocarbon fuel but not water by so forming the the individual fibers as to have surfaces which are selectively wettable as between these two liquids. These surfaces are wettable by (attractive to) the hydrocarbon, but are non-wettable by (are repellent to) the water. The repulsion between the water and the fiber surfaces is great enough to prevent water from passing through the minute passages, while the hydrocarbon will very readily and rapidly flow through these passages and thus through the sheet.

The surfaces on the individual fibers which are selectively wettable by hydrocarbons are for best results formed of a resinous plastic material, desirably selected from the group of materials consisting of polyethylene, polypropylene, and the copolymers thereof. The preferred material for this purpose is polyethylene. In most instances, we find it desirable to provide these surfaces in the form of a thin continuous coating of the proper substance applied to the individual fibers throughout the thickness of the sheet, but thin enough to leave the discussed fluid passages between the different coated fibers. In addition to functioning as a water repellent surface material, the coating substance also functions to securely bond the fibers together in fixed relation in the sheet.

In making a filter sheet of the above discussed coated fiber type, it is extremely difficult to so coat the resin on the fibers as to provide a very thin and yet continuous coating on each of the individual fibers within the sheet. Consequently, certain features of the invention have to do with a preferred method for accomplishing this result. Specifically, this method contemplates both solubilizing and heating the resin during the coating process, and in a manner resulting in the deposition of the desired very thin and uniform coating of resin on the fibers. The resin is applied to the fibers in the form of a hot solution, and the solvent is then driven off to set the resin while maintaining the elevated temperature. The heating is particularly important during the drying or solvent removing operation. During such drying, the resin solution and sheet are preferably maintained at a temperature which is at least about as high as, and desirably substantially above, the normal melting temperature of the undissolved resin (the resin temperature preferably being at least about 190° F.). When this condition is maintained, a very thin and uniform resin coating is attained, without crystallization, unevenness, or any of the other defects which would otherwise be encountered.

With regard to the capacity of a filter of the present type to separate out other materials besides water, it has been found in actual practice that such a filter will actually separate out minute particles which are much smaller than the smallest pores in the filter sheet. Apparently this results from a unique electrostatic type of separation which develops charges on the particles and on the plastic acting to prevent the particles from passing through the pores even though the pores are actually large enough in size to otherwise pass the particles.

The above and other features and objects of the present invention will be better understood from the following detailed description of the typical embodiment illustrated in the accompanying drawing in which:

FIG. 1 is a representation, partially diagrammatic, of a preferred method and apparatus for making a sheet of filter material embodying the invention;

FIG. 2 is a fragmentary perspective view of a sheet of material formed in the FIG. 1 apparatus;

FIG. 3 is a greatly, enlarged fragmentary transverse section taken on line 3—3 of FIG. 2; and FIG. 4 is a showing of a typical filter unit utilizing the filtering material of the present invention.

Referring first to FIG. 2, I have shown at 10 a thin sheet of porous fluid passing filter material which has been formed in accordance with the invention. This sheet 10 is made up of a large number of fibers 11 (see FIG. 3), having surfaces which are freely wettable by a hydrocarbon liquid (such as gasoline or jet aircraft fuel), but which are repellent to and therefore not wettable by water. Preferably, these surfaces are formed on the fibers 11 by providing a thin continuous coating 12 extending about the individual fibers and formed of a material having the desired selective wetting characteristics. This material 12 extends about the fibers in a manner securely bonding adjacent fibers together, as at 13 in FIG. 3, to thus hold all of the fibers together as a unit. As will be apparent from FIG. 3, the coating on each of the individual fibers is sufficiently thin to leave unoccupied spaces or voids between different ones of the coated fibers, so that there are provided in the sheet a large number of minute passageways through which a fluid may flow from one side of the sheet to the other. The various fibers 11 are preferably arranged in random non-woven fashion, desirably in the form of a felted material, so that the various fibers extend non-uniformly in all different directions within the sheet, typically being mechanically interlocked with one another in the same manner as in a conventional felt material. As a result of this random arrangement of the fibers or filaments 11, the minute passageways which are formed between the different fibers are very circuitous, as they extend through the sheet between its opposite sides, to allow for mechanical filtering of dirt, dust and other impurities from the fluid. The thickness of the sheet 10 should preferably be many times the diameter or thickness of the individual fibers. For optimum water separating and filtering action, the size of the fibers is desirably between about ½ and 4 denier, preferably about 3 denier. The thickness of the sheet may typically be between about .040 inch and .080 inch. As will be understood, the provision of many layers of randomly arranged fibers to form the sheet results in the provision of what appears to the eye to be a continuous sheet of material, so that there is no point at which a person may view directly through the sheet without obstruction of the line of sight by several of the fibers.

It is contemplated that perhaps in some instances it might be possible to form the fibers 11 themselves out of a material having the desired selective wetting characteristics, in which case it might be possible to allow the surfaces of the fibers themselves to directly contact the fluid being filtered, and to omit the fiber coating material 12 from the sheet. However, it is felt that for optimum results the coated fiber arrangement shown in FIG. 3 is more desirable for most uses. One important advantage of this arrangement resides in the manner in which the coating material functions to locally bond together adjacent fibers at the points at which they cross one another.

In the coated fiber type of filter material shown in FIGS. 2 and 3, the fibers 11 may be formed of any of various materials, desirably a synthetic resinous plastic material having very little capacity for absorbing water (preferably not capable of absorbing more than about .05 percent water). The most desirable material which has been found for this purpose thus far is the product sold by E. I. du Pont De Nemours as "Dacron," which is a terephthalate polyester made by the condensation of dimethyl terephthalate and ethylene glycol, and whose maximum water absorption is about .05 percent.

As previously mentioned, the coating material 12 on the fibers 11 consists of a material which is wettable by (attractive to) hydrocarbon liquids such as gasoline and jet fuel, but which is not wettable by (is repellent to) water. This selectively wettable material forms a continuous coating about the individual fibers, preventing contact of the fluid being filtered with any portion of the individual fibers 11. The repellency of material 12 for water is sufficiently great to effectively repel all water against flow through the minute pasages formed in sheet 10 between the different coated fibers. At the same time, a hydrocarbon liquid, being attracted to material 12, will flow very readily and rapidly through the minute passages in sheet 10, so that the filter sheet 10 will function to positively separate water from a hydrocarbon liquid. Desirably, the wettability of the coating 12 by a hydrocarbon liquid should be at least great enough to maintain a contact angle between the two of not more than about 10 degrees, and the repellency of coating 12 for water should be that represented by a contact angle of at least about 30 degrees. Also it is found desirable that the size of the minute passages formed between the different coated fibers be small enough to mechanically screen out or filter out all particles larger than about .0020 inch.

We prefer to form the coating 12 of a resinous plastic material, desirably selected from the group of such materials consisting of polyethylene, polypropylene and copolymers thereof. The preferred material at present is polyethylene, coated onto fibers of Dacron.

In actual practice, it has been found to be rather difficult by conventional coating processes to apply the coating 12 of polyethylene or the like as a thin layer on the individual fibers in the manner shown in FIG. 3. In this connection, FIG. 1 represents a unique type of apparatus, and method, which have been developed to produce the coated fiber type of filter sheet represented in FIGS. 2 and 3. In this method, the first step is to pass the fibers of Dacron or other material into and through a conventional felting machine, represented at 15 in FIG. 1. This machine forms the fibers into a sheet of felt, in which the individual fibers extend in random fashion in virtually every direction, and throughout the thickness of the sheet, but with the individual fibers being sufficiently interlocked, in the manner of conventional felt material, to retain the fibers together in their sheet like form. From the felting machine, the sheet material passes to a coating unit represented generally at 16, which unit includes a substantially closed housing 17, typically having its walls suitably heat insulated, and which housing may be supported on a floor surface represented at 18. The housing 17 is elongated in the direction of advancement of the sheet material therethrough, and the interior of the housing is maintained at an elevated temperature, as will be brought out in greater detail at a later point. At the inlet end 19 of housing 17, the uncoated felted sheet material 10a (from felting machine 15) may be mounted on a supply roller or reel 20, which is journaled by suitable bearings 21 for rotation about an axis 22. From this supply roll, the felt sheet material may pass downwardly at 23, and then about an idler roller 24 turning about an axis 25, to extend horizontally at 26 through an inlet aperture 27 at the end of housing 17, to the interior of the housing. At the opposite end of housing 17, the properly coated sheet of filter material 10 leaves the housing through an exit slot or aperture 28, to pass about an idler roller 29, and be wound onto a power driven final roller 30, which is journaled by bearing 31 for rotation about an axis 32 extending parallel to the axes of the other rollers 20, 24 and 29. The coated sheet is cooled by normal radiant heat loss after leaving housing 17 and before reaching roller 30.

Within the interior of the heated housing 17, there is contained a tank 33 containing a body of liquid 12a for forming the coating 12 on the individual fibers of sheet 10a. As has been mentioned previously, this material is desirably selected from the group of resinous plastic materials consisting of polyethylene, polypropylene, and their copolymers. Of particular importance in assuring a proper thin uniform coating of material 12 on the individual fibers is the maintenance of two conditions in connection with coating liquid 12a. Specifically, it is important that this plastic be dissolved in a solvent when contained within tank 33, and when applied to sheet 10a; and secondly, it is important that the liquid and sheet 10a be maintained at a temperature which is at least about as high as, and preferably considerably above (say at least 10° Fahrenheit above) the normal melting temperature of the resin being employed. By normal melting temperature, I means the temperature at which the resin will melt when undissolved and when at atmospheric pressure. This elevated temperature should be maintained during the entire period of drying, that is during the evaporation of the solvent from the sheet of material. Also, it is best for the elevated temperature to be maintained while liquid 12a is within tank 33, and during the advancement of the sheet from that tank to the drying zone 35. The elevated temperature within tank 33 can be maintained by a suitable heater represented at 34, typically positioned beneath the tank. To assure distribution of the resin over the individual fiber surfaces, and without filling in the interfiber spaces, it is found best that the solution of material 12a in tank 33 be at least about 75 percent solvent. For best film deposition, the solution may be between about 3% and 25% resin and the rest solvent, with a 10% solution being preferred in most instances. Any suitable solvent for the particular resin being employed may be used. For example, where polyethylene is the coating resin, the solvent may be toluene or naphtha.

After passing through entrance slot 27, the felted sheet 10a advances about an idler roller 36, and then extends downwardly into the solution 12a within tank 33, being guided about the underside of a roller 37 suitably journaled for rotation about an axis parallel to axes 22, 25, and 32. Such immersion of the sheet within the solution 12a fully impregnates the sheet with the solution, the latter extending into and completely filling the various inter-fiber passages and spaces within the sheet. After leaving the solution 12a within tank 33, the impregnated sheet 10a may advance at an inclination as seen at 38 toward a restricted space provided between a pair of rollers 39 and 40, which are spring pressed together and act to squeeze out excess solution from the felted sheet. The lower of these two rollers 39 may be journaled by bearings represented at 41 for rotation about an axis 42 extending parallel to the other axes 22, 25, etc. This roller 39 is suitably power driven, as by means of a belt 43 driven by a motor 44. The upper roller 40 is power driven from roller 38 by means of a drive belt 45, which may be crossed in figure 8 fashion as shown so that the two rollers operate in unison to advance sheet 10a to the right as seen in FIG. 1. This upper roller 40 is journaled at its opposite ends by a pair of bearings 46, which are mounted by guides 47 for vertical shifting movement, and are spring pressed downwardly by suitable springs 48, to urge roller 40 downwardly toward roller 39 and thus effectively squeeze out excess solution from sheet 10a. The spring force 48, however, is sufficiently light to leave in the sheet 10a a substantial amount of the solution, which is sufficient to provide the continuous coating 12 on the individual fibers of the ultimate sheet represented in FIG. 3. For example, the amount of solution (by weight) left in the sheet at rollers 39 and 40 may be equal to between about 50% and 150% of the weight of the unimpregnated sheet. The excess solution which is squeezed from sheet 10a by rollers 39 and 40 is allowed to fall downwardly along the surface of roller 39 and back into tank 33.

After leaving the space between the two rollers 39 and 40, the impregnated sheet 10a moves horizontally along the upper surface of a conveyor belt 49, which is mounted at its opposite ends by a pair of rollers 50 and 51, and which is supported between those main rollers by intermediate idler rollers 52. One of the main rollers (typically roller 50) may be power driven by a belt 51 from motor 44, in a direction to advance the sheet 10a at the same rate as that sheet is advanced by the other power driven portions of the apparatus. The area from rollers 39 and 40 to the exit slot 29 is the drying zone, within which the solvent is completely evaporated from sheet 10a, as it progressively advances toward slot 28. During this drying, the temperature of the sheet and its carried solution is maintained at the previously mentioned elevated temperature, at least as high as, and preferably well above, the normal melting temperature of the undissolved resin. This high temperature in the drying zone may be maintained by a series of heaters 23, located above the path of sheet 10a at the drying zone, and typically being suitable electrically energized heater units. These electrical heaters may be either of the resistance type, or more preferably of the radiant heat type.

It is found desirable that a circulation of heated air be maintained along the upper surface of coated sheet 10a at the drying zone, and it is preferred that this circulation of air be in a direction the opposite of the direction of advancement of the sheet itself. For this purpose, a power driven fan 154 may be provided at the exit end of housing 17, to blow air from right to left as seen in FIG. 1, toward the beginning of the drying zone. By the time the sheet reaches exit aperture 28 of housing 17, all of the solvent should be evaporated from the sheet, and the resin is by that time deposited on the individual fibers as a very thin continuous uniform coating in the manner represented in FIG. 3. The ultimate product is then wound onto takeup roll 30 which may be suitably power driven by the same motor 44 that drives the other rollers.

It has been found that, if the solution 12a is not maintained at the discussed elevated temperature during drying, and preferably also during application of the solution to the sheet, the desired very thin uniform coating 12 is not produced on the fibers of the sheet. Similarly, a proper coating is not produced if the resin is applied in undissolved form, rather than as a solution. Consequently, it is extremely important both that the resin be in solution form, and that the solution and the sheet be maintained at the discussed elevated temperature during evaporation of the solvent (during drying).

Typical Example of Process

In one typical process embodying the invention, and utilizing the apparatus shown in FIG. 1, the fibers 11 were formed of three denier Dacron, and were felted together in felting machine 15 to form a sheet of material having a thickness of .040 inch. The solution 12a was a 10% solution of polyethylene No. 617 as sold by Semet-Solvay Petrochemical Division, New York, N. Y., in a mixed solvent consisting of carbon tetrachloride and V.M.P. naphtha. The carbon tetrachloride was included in the solvent in order to raise its flash point. Solution 12a was maintained at a temperature of 110° C., which was well above the normal melting point of the polyethylene at atmospheric pressure and when undissolved. Also, the air within chamber 17, and the sheet 10a as well as its impregnating liquid while in the housing 17, were maintained at this same elevated temperature until the solvent was all evaporated. The rate of advancement of the sheet through the housing was such that the sheet was maintained at the elevated temperature within the drying zone for a period of 3 minutes.

FIG. 4 shows somewhat schematically a typical filtering device 54, utilizing a sheet of filter material constructed in accordance with the invention. This device 54 has an outer fluid tight housing 55, with an inlet 57 and an outlet 56. From inlet 57, an incoming fuel containing some water flows into the space about a cylindrical metal element 58, which is closed at its upper end but has apertures in its side wall at 59. About this side wall, there is positioned a tube 60 formed from the sheet material 10 of FIGS. 2 and 3, with this tube 60 being retained by a cap 61 in such a manner as to require flow of all fluid through sheet 60 in passing from the exterior of part 58 to its interior, for ultimate discharge from outlet 56. Water separated from the fuel collects in the bottom of housing 55, about the outside of filter tube 60, and is periodically drained therefrom as through a drain line and valve 161.

If gasoline, a jet fuel, or other similar hydrocarbon liquid, containing some entrained water, is admitted into inlet 57 of FIG. 4, the element 60 will readily pass the hydrocarbon from about part 58 to its interior and thus to outlet 56. However, sheet material 60 will not pass any entrained water to the outlet, and thus the device will effectively function to separate water from the fuel. Also, the filter sheet 60 will function to filter out any dust, dirt or other particles from the fuel, so that the latter is completely clean as it leaves the outlet. Where the coating 12 is formed of polyethylene or other similar resinous plastic material, it has been found that the sheet 60 will actually separate out particles which are smaller than the dimensions of the passages through element 60 (sheet 10 of FIGS. 2 and 3). Apparently, this effect is attained by reason of an electrostatic attraction which develops between the resinous plastic material 12 and the particles, and which acts to tightly hold the particles on the sheet.

The water repelling efficiency of sheet 10 (or element 60 of FIG. 4) can be increased somewhat by making the inlet side of sheet 10 or 60 substantially slick or smooth, whereas the outlet side may be rougher or more irregular. This result may be achieved by forming one of the rollers 39 or 40 to have a very slick or smooth surface, while giving the other roller a somewhat irregularized surface.

In some cases, it is found desirable to bond the fibers of initial felt sheet 10a together to a certain extent before that sheet passes to the treating apparatus within housing 17. For example, this may be done in order to assure against the separation of any of the fibers from the sheet 10a by handling between the time of the felting operation in device 15 and the subsequent treating operation within housing 17. Such initial bonding may typically be effected by heating the felted uncoated mat to a temperature just high enough to locally fuse the different fibers together at their points of contact, but not high enough to melt the materials completely or destroy their basic fiber shape.

We claim:

1. The method of making a filter element that comprises providing a porous sheet of material containing fibers arranged in closely spaced relation but with a large number of minute fluid passages formed between said fibers for passing a fluid from one side of the sheet to the other, applying to said sheet and into said passages a solution of a resinous plastic material dissolved in a solvent, said resinous plastic material being chosen from the group consisting of polyethylene, polypropylene, and the copolymers of polyethylene and polypropylene with each other, heating said sheet and said solution, after the solution has been filled into said passages, and thereby evaporating said solvent from the solution and from said passages, adding sufficient heat to the sheet and solution to maintain both the sheet and solution, during said evaporation of the solvent, at a temperature which is at least about as high as the fusion temperature of the resin, and thereby depositing the resin as a thin continuous coating on the surfaces of the individual fibers throughout the thickness of the sheet, said solvent being present in sufficient quantity in the initial solution to leave said passages open to fluid flow through the sheet after evaporation of the solvent.

2. The method as recited in claim 1, in which said resin is polyethylene, and said fibers are formed of terephthalate polyester.

3. The method as recited in claim 1, including advancing said sheet in a predetermined direction during the evaporation of said solvent, said heating of the solution and sheet being effected by blowing heated air past the sheet in essentially the opposite direction during said evaporation.

4. The method as recited in claim 1, including maintaining said solution at said temperature at least as high as said fusion temperature during the initial application of the solution to said sheet.

5. The method of making a filter element that comprises providing a porous sheet of material containing fibers arranged in closely spaced relation but with a large number of minute fluid passages formed between said fibers for passing a fluid from one side of the sheet to the other, immersing said sheet in a solution of a resinous plastic material dissolved in a solvent and thereby filling all of said passages with said solution, said resinous plastic material being chosen from the group consisting of polyethylene, polypropylene, and the copolymers of polyethylene and polypropylene with each other, evaporating said solvent from the solution and from said passages, maintaining the sheet and solution, during said evaporation of the solvent, at a temperature which is at least about as high as the fusion temperature of the resin, and thereby depositing the resin as a thin continuous coating on the surfaces of the individual fibers throughout the thickness of the sheet, said solvent being present in sufficient quantity in the initial solution to leave said passages open to fluid flow through the sheet after evaporation of the solvent.

6. The method of making a filter element that comprises providing a porous sheet of material containing fibers arranged in closely spaced relation but with a large number of minute fluid passages formed between said fibers for passing a fluid from one side of the sheet to the other, immersing said sheet in a solution of a resinous plastic material dissolved in a solvent and thereby filling all of said passages with said solution, then squeezing excess solution from said sheet, said resinous plastic material being chosen from the group consisting of polyethylene, polypropylene, and the copolymers of polyethylene and polypropylene with each other, evaporating said solvent from the solution and from said passages, maintaining the sheet and solution, during said evaporation of the solvent, at a temperature which is at least about as high as the fusion temperature of the resin, and thereby depositing the resin as a thin continuous coating on the surfaces of the individual fibers throughout the thickness of the sheet, said solvent being present in sufficient quantity in the initial solution to leave said passages open to fluid flow through the sheet after evaporation of the solvent.

7. The method of making a filter element that comprises providing a porous sheet of material containing fibers arranged in random unwoven closely spaced relation with a large number of minute fluid passages formed between said fibers for passing a fluid from one side of the sheet to the other, applying to said sheet and into said passages a solution of a resinous plastic material dissolved in a solvent, said resinous plastic material being chosen from the group consisting of polyethylene, polypropylene, and the copolymers of polyethylene and polypropylene with each other, heating said sheet and said solution, after the solution has been filled into said passages, and thereby evaporating said solvent from the solution and from said passages, adding sufficient heat to the sheet and solution to maintain both the sheet and solution, during said evaporation of the solvent, at a temperature which is at least about as high as the fusion temperature of the resin, and thereby depositing the resin as a thin continuous coating on the surfaces of the individual fibers throughout the thickness of the sheet, said solvent being present in sufficient quantity in the initial solution to leave said passages open to fluid flow through the sheet after evaporation of the solvent.

8. The method of making a filter element that comprises providing a porous sheet of material containing fibers arranged in random unwoven closely spaced relation with a large number of minute fluid passages formed between said fibers for passing a fluid from one side of the sheet to the other, applying to said sheet and into said passages a solution of polyethylene dissolved in a solvent, heating said sheet and said solution, after the solution has been filled into said passages, and thereby evaporating said solvent from the solution and from said passages, adding sufficient heat to the sheet and solution to maintain both the sheet and solution, during said evaporation of the solvent, at a temperature which is at least about as high as the fusion temperature of the polyethylene, and thereby depositing the polyethylene as a thin continuous coating on the surfaces of the individual fibers throughout the thickness of the sheet, said solvent being present in sufficient quantity in the initial solution to leave said passages open to fluid flow through the sheet after evaporation of the solvent.

9. The method of making a filter element that comprises providing a porous sheet of material containing terephthalate polyester fibers arranged in random unwoven closely spaced relation with a large number of minute fluid passages formed between said fibers for passing a fluid from one side of the sheet to the other, applying to said sheet and into said passages a solution of polyethylene dissolved in a solvent, heating said sheet and said solution, after the solution has been filled into said passages, and thereby evaporating said solvent from the solution and from said passages, adding sufficient heat to the sheet and solution to maintain both the sheet and solution, during the initial application of the solution to said sheet, and also during said evaporation of the solvent, at a temperature which is at least about as high as the fusion temperature of the polyethylene, and thereby depositing the polyethylene as a thin continuous coating on the surfaces of the individual fibers throughout the thickness of the sheet, said solvent being present in sufficient quantity in the initial solution to leave said passages open to fluid flow through the sheet after evaporation of the solvent.

10. The method of making a filter element that comprises providing an elongated porous sheet of material containing fibers arranged in random felted closely spaced relation with a large number of minute fluid passages formed between the fibers and adapted to pass a fluid from one side of the sheet to the other, advancing said sheet through a solution of a resinous plastic material in a solvent to apply said solution to the sheet and into said passages, said resinous plastic material being chosen from the group consisting of polyethylene, polypropylene, and the copolymers of polyethylene and polypropylene with each other, passing said sheet between rollers to squeeze excess solution therefrom, then advancing said sheet and carried solution through a drying zone and evaporating the solvent from the sheet in said zone by blowing heated air past the sheet in said zone in a direction generally opposite to the direction of advancement of the sheet through the zone, adding sufficient heat to the sheet and solution to maintain both the sheet and carried solution, while in said drying zone, at a temperature which is at least about as high as the fusion temperature of the resin, and thereby depositing the resin as a thin continuous coating on the surfaces of the individual fibers throughout the thickness of the sheet, said solvent being present in sufficient quantity in the initial solution to leave said passages open to fluid flow through the sheet after evaporation of the solvent.

References Cited in the file of this patent

UNITED STATES PATENTS

| | | |
|---|---|---|
| 1,621,725 | Hills | Mar. 22, 1927 |
| 2,355,822 | Rugeley | Aug. 15, 1944 |
| 2,404,817 | Strain | July 30, 1946 |
| 2,607,494 | Valente et al. | Aug. 19, 1952 |
| 2,698,260 | Meauze et al. | Dec. 28, 1954 |
| 2,827,395 | Jordan et al. | Mar. 18, 1958 |
| 2,855,330 | Griswold et al. | Oct. 7, 1958 |
| 2,994,940 | Ferrell et al. | Aug. 8, 1961 |

OTHER REFERENCES

Hackh's "Chemical Dictionary," 3rd ed., McGraw-Hill Book Co., page 557.

"Chemical Engineering Progress," vol. 53, No. 7, July 1957, pp. 313–319.

"Polyethylene," T. O. J. Kresser, Reinhold Publishing Corp., New York, copyright 1957, pp. 21, 22, 128.

"Polythene," Renfrew and Morgan, Iliffe and Sons, Ltd., London, bears the inscription "First published 1957" pp. 242–245, 397, 398, 432, 514, 518 and 520.